(12) United States Patent
Goodson et al.

(10) Patent No.: US 7,691,470 B2
(45) Date of Patent: *Apr. 6, 2010

(54) LAMINATE STRUCTURE WITH POLYCARBONATE SHEETS

(75) Inventors: Raymond Lynn Goodson, Sandy, UT (US); Boyd Talley Goodson, Salt Lake City, UT (US)

(73) Assignee: 3form, Salt Lake City, UT (US)

( * ) Notice: Subject to any disclaimer, the term of this patent is extended or adjusted under 35 U.S.C. 154(b) by 405 days.

This patent is subject to a terminal disclaimer.

(21) Appl. No.: 10/465,465

(22) Filed: Jun. 18, 2003

(65) Prior Publication Data

US 2004/0053040 A1 Mar. 18, 2004
US 2005/0175832 A9 Aug. 11, 2005

Related U.S. Application Data

(63) Continuation-in-part of application No. 10/086,269, filed on Mar. 1, 2002, now abandoned.

(60) Provisional application No. 60/389,392, filed on Jun. 18, 2002, provisional application No. 60/273,076, filed on Mar. 5, 2001.

(51) Int. Cl.
 *B32B 7/00* (2006.01)
(52) U.S. Cl. .................... 428/212; 428/13; 428/66.5; 428/68; 428/332; 428/339; 428/346; 428/354; 428/542.2; 428/483; 428/326
(58) Field of Classification Search .............. 428/339, 428/332, 327, 323, 322.2, 357, 220, 212, 428/213, 412, 542.2, 483, 13, 66.4, 66.5, 428/68, 195.1, 346, 354
See application file for complete search history.

(56) References Cited

U.S. PATENT DOCUMENTS

| | | | |
|---|---|---|---|
| 2,660,824 A | 12/1953 | Neugass | |
| 3,255,781 A | 6/1966 | Gillespie | |
| 3,371,003 A | 2/1968 | Goodman | |
| 3,465,062 A | 9/1969 | Holoch et al. | |
| 3,560,600 A | 2/1971 | Gliniecki | |
| 3,616,029 A | 10/1971 | Lerman | |
| 3,833,537 A | 9/1974 | Jaquiss | |
| 3,937,765 A | 2/1976 | Toy et al. | |
| 3,964,958 A | 6/1976 | Johnston | |
| 4,199,489 A | 4/1980 | Short | |
| 4,219,635 A | 8/1980 | Cooke | |
| 4,227,979 A * | 10/1980 | Humke et al. .................. 522/14 |
| 4,235,948 A | 11/1980 | Holmes | |
| 4,301,040 A | 11/1981 | Berbeco | |
| 4,308,782 A | 1/1982 | Hartry | |
| 4,368,231 A | 1/1983 | Egert et al. | |
| 4,403,004 A | 9/1983 | Parker et al. | |
| 4,409,275 A * | 10/1983 | Samowich .................. 428/138 |
| 4,443,581 A | 4/1984 | Robeson et al. | |
| 4,521,835 A | 6/1985 | Meggs et al. | |
| 4,543,292 A | 9/1985 | Giles, Jr. et al. | |
| 4,634,483 A | 1/1987 | Spengler | |
| 4,642,255 A * | 2/1987 | Dlubak .................. 428/38 |
| 4,648,690 A | 3/1987 | Ohe | |
| 4,656,080 A | 4/1987 | Takahashi et al. | |
| 4,683,172 A | 7/1987 | LeGrand et al. | |
| 4,824,722 A * | 4/1989 | Jarrett .................. 428/430 |
| 4,900,611 A | 2/1990 | Carroll | |
| 4,921,755 A | 5/1990 | Carroll et al. | |
| 4,939,009 A | 7/1990 | Beavers et al. | |
| 5,064,980 A | 11/1991 | Grossman et al. | |
| 5,073,421 A | 12/1991 | Akao | |
| 5,108,678 A | 4/1992 | Hirasaka et al. | |
| 5,192,609 A | 3/1993 | Carroll | |
| 5,221,569 A | 6/1993 | Rohrka et al. | |
| 5,277,952 A * | 1/1994 | Watras .................. 428/46 |
| 5,352,532 A | 10/1994 | Kline | |
| 5,364,926 A | 11/1994 | Sakashita et al. | |
| 5,413,828 A | 5/1995 | De Keyser | |
| 5,458,966 A | 10/1995 | Matsumoto et al. | |

(Continued)

FOREIGN PATENT DOCUMENTS

DE 1694354 6/1971

(Continued)

OTHER PUBLICATIONS

Chemical Abstracts, vol. 116, No. 4, Jan. 27, 1992 Columbus, Ohio, US; abstract No. 22152, XP002126370.

(Continued)

*Primary Examiner*—David R Sample
*Assistant Examiner*—Lawrence D Ferguson
(74) *Attorney, Agent, or Firm*—Workman Nydegger

(57) ABSTRACT

Disclosed is a decorative laminate structure having at least two sheets of polycarbonate and at least one decorative image layer there-between two sheets of polycarbonate, and a method of making the decorative laminate structure. Through heat and pressure the sheet layers and the decorative image layer are bonded together resulting in a decorative laminate structure of this invention. This product is intended for use primarily to produce decorative articles which include counter tops, table tops, cabinet doors, game boards, toys, panels for shower stalls, hot tubs, markerboards, indoor and outdoor signs, seamless vanity tops including sink, soap dish, back splash, flooring and others.

31 Claims, 3 Drawing Sheets

U.S. PATENT DOCUMENTS

| | | | |
|---|---|---|---|
| 5,496,630 A | 3/1996 | Hawrylko et al. | |
| 5,514,428 A | 5/1996 | Kunert | |
| 5,605,751 A | 2/1997 | Suzuki et al. | |
| 5,643,666 A | 7/1997 | Eckart et al. | |
| 5,663,280 A | 9/1997 | Ogoe et al. | |
| 5,743,631 A | 4/1998 | Bigham | |
| 5,760,120 A | 6/1998 | Itoh et al. | |
| 5,776,838 A | 7/1998 | Dellinger | |
| 5,871,570 A | 2/1999 | Koyama et al. | |
| 5,894,048 A | 4/1999 | Eckart et al. | |
| 5,899,783 A | 5/1999 | Kimbrell, Jr. et al. | |
| 5,958,539 A | 9/1999 | Eckart et al. | |
| 5,998,028 A * | 12/1999 | Eckart et al. | 428/383 |
| 6,022,050 A * | 2/2000 | Kline | 283/81 |
| 6,025,069 A | 2/2000 | Eckart et al. | |
| 6,044,650 A | 4/2000 | Cook et al. | |
| 6,081,659 A | 6/2000 | Garza et al. | |
| 6,117,384 A | 9/2000 | Laurin et al. | |
| 6,136,441 A * | 10/2000 | MacGregor et al. | 428/412 |
| 6,187,699 B1 | 2/2001 | Terakawa et al. | |
| 6,189,330 B1 | 2/2001 | Retallick et al. | |
| 6,221,939 B1 | 4/2001 | Campbell et al. | |
| 6,228,912 B1 | 5/2001 | Campbell et al. | |
| 6,235,380 B1 | 5/2001 | Tupil et al. | |
| 6,319,432 B1 | 11/2001 | Harrod et al. | |
| 6,322,862 B1 * | 11/2001 | Sakai | 428/13 |
| 6,333,094 B1 | 12/2001 | Schneider et al. | |
| 6,369,141 B1 | 4/2002 | Ishii et al. | |
| 6,387,477 B1 | 5/2002 | Ogura et al. | |
| 6,388,046 B1 | 5/2002 | Campbell et al. | |
| 6,401,002 B1 | 6/2002 | Jang et al. | |
| 6,433,046 B1 | 8/2002 | Campbell et al. | |
| 6,445,969 B1 | 9/2002 | Kenney et al. | |
| 6,448,316 B1 | 9/2002 | Capitelli et al. | |
| 6,562,163 B1 * | 5/2003 | Wellington | 156/63 |
| 6,569,928 B1 | 5/2003 | Levchik et al. | |
| 6,569,929 B2 | 5/2003 | Falcone et al. | |
| 6,683,520 B1 | 1/2004 | Sakai | |
| 6,685,993 B1 * | 2/2004 | Hansson et al. | 427/551 |
| 6,743,327 B2 * | 6/2004 | Schober | 156/309.6 |
| 6,780,905 B2 | 8/2004 | Bienmueller | |
| 6,969,745 B1 | 11/2005 | Taraiya et al. | |
| 7,114,737 B1 | 10/2006 | Rasmussen | |
| 2001/0016626 A1 | 8/2001 | Vollenberg et al. | |
| 2002/0019466 A1 | 2/2002 | Falcone et al. | |
| 2002/0032299 A1 | 3/2002 | Matsumoto et al. | |
| 2002/0100540 A1 | 8/2002 | Savitski et al. | |
| 2002/0115761 A1 | 8/2002 | Eckel et al. | |
| 2002/0122926 A1 | 9/2002 | Goodson | |
| 2002/0145276 A1 | 10/2002 | Veiga | |
| 2003/0083408 A1 | 5/2003 | Bienmuller et al. | |
| 2003/0113485 A1 | 6/2003 | Schober | |
| 2003/0171494 A1 | 9/2003 | Aramaki et al. | |
| 2004/0039090 A1 | 2/2004 | Seidel et al. | |
| 2004/0053040 A1 | 3/2004 | Goodson et al. | |
| 2004/0127653 A1 | 7/2004 | Ellington et al. | |
| 2004/0202800 A1 | 10/2004 | Schober | 428/13 |
| 2005/0049369 A1 | 3/2005 | O'Neil et al. | |

FOREIGN PATENT DOCUMENTS

| | | |
|---|---|---|
| DE | 2505326 | 8/1975 |
| DE | 2536654 | 2/1977 |
| DE | 4214383 | 11/1993 |
| DE | 29615956 | 11/1996 |
| DE | 10137930 | 2/2003 |
| EP | 0016617 | 10/1980 |
| EP | 0072626 | 2/1983 |
| EP | 0171730 | 2/1986 |
| EP | 0188791 | 7/1986 |
| EP | 0227922 | 7/1987 |
| EP | 0278685 | 8/1988 |
| EP | 0365266 | 4/1990 |
| EP | 0372324 | 6/1990 |
| EP | 0 265 171 B1 | 9/1991 |
| EP | 0470618 | 2/1992 |
| EP | 0491266 | 6/1992 |
| EP | 0537577 | 4/1993 |
| EP | 0582383 | 2/1994 |
| EP | 0587353 | 3/1994 |
| EP | 0626256 | 11/1994 |
| EP | 0637509 | 2/1995 |
| EP | 0638749 | 2/1995 |
| EP | 0668318 | 8/1995 |
| EP | 0680996 | 11/1995 |
| EP | 0728811 | 5/1996 |
| EP | 0731307 | 9/1996 |
| EP | 0742096 | 11/1996 |
| EP | 0795398 | 9/1997 |
| EP | 0754897 | 11/1997 |
| EP | 0899306 | 3/1999 |
| EP | 0909635 | 4/1999 |
| EP | 0 928 683 A2 | 7/1999 |
| EP | 0 933 256 A2 | 8/1999 |
| EP | 01131378 | 12/2001 |
| EP | 1 312 472 A1 | 5/2003 |
| FR | 1388691 | 2/1965 |
| FR | 1555527 | 1/1969 |
| FR | 2194543 | 3/1974 |
| FR | 2237859 | 2/1975 |
| FR | 2661362 | 4/1990 |
| FR | 2661362 A | 10/1991 |
| GB | 1461255 | 1/1977 |
| GB | 1517652 | 7/1978 |
| JP | 55135158 | 1/1981 |
| JP | 56123235 | 9/1981 |
| JP | 59123659 | 7/1984 |
| JP | 63022816 | 1/1988 |
| JP | 63194949 | 8/1988 |
| JP | 1206010 | 8/1989 |
| JP | 1249336 | 10/1989 |
| JP | 03143950 | 6/1991 |
| JP | 03285958 | 12/1991 |
| JP | 04214779 | 8/1992 |
| JP | 04224385 | 8/1992 |
| JP | 05293916 | 11/1993 |
| JP | 631862 | 2/1994 |
| JP | 53083884 | 2/1994 |
| JP | 06220290 | 8/1994 |
| JP | 7125000 | 5/1995 |
| JP | 07126483 | 5/1995 |
| JP | 07195496 | 8/1995 |
| JP | 08085174 | 4/1996 |
| JP | 09277483 | 10/1997 |
| JP | 10175985 | 6/1998 |
| JP | 2002/161211 | 6/2002 |
| WO | WO93/22373 | 11/1993 |
| WO | WO93/22382 | 11/1993 |
| WO | WO 96/08370 | 3/1996 |
| WO | WO97/22474 | 6/1997 |
| WO | WO98/29245 | 7/1998 |
| WO | WO99/07779 | 2/1999 |
| WO | WO00/12609 | 3/2000 |
| WO | WO00/12611 | 3/2000 |
| WO | WO00/12612 | 3/2000 |
| WO | WO00/12614 | 3/2000 |
| WO | WO 00/24580 | 5/2000 |
| WO | WO 00/27927 | 5/2000 |
| WO | WO 03/023684 A1 | 3/2003 |
| WO | WO2005/044906 | 5/2005 |
| WO | WO2006/096196 | 9/2006 |
| WO | WO2006/127219 | 11/2006 |
| WO | WO2006/127222 | 11/2006 |

| | |
|---|---|
| WO | WO2006/127231 11/2006 |

OTHER PUBLICATIONS

Chemical Abstracts, vol. 122, No. 12, Mar. 20, 1995 Columbus, Ohio, US, abstract No. 134965.
Chemical Abstracts, vol. 117, No. 2, Jul. 13, 1992 Columbus, Ohio, US, abstract No. 9164.
Van Aert, H A M, et al. Poly(bsphenol A carbonate)-Poly(dimethyliloxane) multiblock copolymers, Polymer, Elsevier Science Publishers B.V, GB vol. 42, No. 5, Mar. 2001 pp. 1781-1788.
Standard Test Method for Surface Burning Characteristics of Building Materials, ASTM International; pp. 1-19, May 7, 2004.
Reynald Tombini, Abstract of French Patent 2661362, Mar. 1992, Derwent Information Ltd., USA. (Attached and referred to as Document 1).
Restriction Requirement mailed Sep. 26, 2003, U.S. Appl. No. 10/086,269. (Attached and referred to as Document 2).
Office Action mailed Jan. 23, 2004, U.S. Appl. No. 10/086,269. (Attached and referred to as Document 3).
Office Action mailed May 24, 2004, U.S. Appl. No. 10/086,269. (Attached and referred to as Document 4).
Office Action mailed May 5, 2005, U.S. Appl. No. 10/821,307. (Attached and referred to as Document 5).
Notice of Allowance mailed Nov. 29, 2005, U.S. Appl. No. 10/821,307. (Attached and referred to as Document 6).
Office Action mailed May 29, 2007, U.S. Appl. No. 11/175,240. (Attached and referred to as Document 7).
Office Action mailed Nov. 9, 2007, U.S. Appl. No. 11/175,240. (Attached and referred to as Document 8).
Office Action mailed Mar. 27, 2008, U.S. Appl. No. 11/175,240. (Attached and referred to as Document 9).
Office Action mailed Oct. 16, 2007, U.S. Appl. No. 11/203,985. (Attached and referred to as Document 10).
Office Action mailed Feb. 28, 2008, U.S. Appl. No. 11/203,985. (Attached and referred to as Document 11).
Office Action mailed Jul. 7, 2008, U.S. Appl. No. 11/203,985. (Attached and referred to as Document 12).
Office Action mailed Feb. 26, 2009, U.S. Appl. No. 11/203,985.
Notice of Allowance mailed Apr. 16, 2009, U.S. Appl. No. 11/203,985.
Office Action mailed Dec. 29, 2008, U.S. Appl. No. 11/175,240.
Office Action mailed Jun. 10, 2009, U.S. Appl. No. 11/175,240.

* cited by examiner

A.

B.

C.

D.

LAMINATE STRUCTURE WITH POLYCARBONATE SHEETS

RELATED APPLICATIONS

This application claims priority to U.S. Provisional application Ser. No. 60/389,392, filed Jun. 18, 2002. The disclosure of the priority application is incorporated by reference in its entirety. This application is also a continuation-in-part of U.S. patent application Ser. No. 10/086,269, filed on Mar. 1, 2002 now abandoned, entitled "Laminated Article and Method of Making Same", which claims the benefit of priority to U.S. Provisional application Ser. No. 60/273,076, filed on Mar. 5, 2001, entitled "Lamination of Dissimilar Materials and Method for Making Same".

FIELD OF THE INVENTION

The present invention relates to a decorative laminated structure having decorative images and/or custom colors embedded therein and a method of making the decorative laminated structure. The decorative laminate structures according to the present invention may be used not only in the construction industry as wall coverings, as glazing for windows, in partitions, as decorative paneling and in select furniture applications, but also in high-heat and performance driven applications, such as automotive, marine, lighting, flooring, and aerospace. One or both surfaces of the articles may be textured during the formation of the articles.

BACKGROUND OF THE INVENTION

There has been a great demand for translucent building materials with decorative images, textures and colors. Traditionally these materials have been made by mixing colors in the base resin material limiting the options to only large runs thus eliminating the possibility of customizing colors for each project.

Laminate structures are composites made from any one of several types of thermosetting plastic materials and may contain a printed pattern or an image. However, to date, the production of such laminated structures has often required complex processing techniques, added production time, and/or additional capital. In addition, these laminate structures could not be easily thermoformed and were typically rigid and brittle. Also, certain laminate materials which offer the prospect of providing improved properties in decorative laminate structures often do not readily adhere to adjacent layers, which then resulted in non-uniform lamination or delamination after a period of use.

U.S. Pat. Nos. 5,894,048, 5,643,666, 5,998,028, 5,958,539, 6,025,069 and PCT Application No. WO 97/22474 disclose a decorate laminate structure which uses polyethylene teraphtalate glycol polyester (PETG polyester).

SUMMARY OF THE INVENTION

In a first aspect, the invention provides a method of making a decorative laminate structure including providing a first sheet comprising polycarbonate, the first sheet having a thickness between 0.13 and 12.7 mm, providing a second sheet comprising polycarbonate, the second sheet having a thickness between 0.13 and 12.7 mm, and providing at least one a decorative image layer between the first and second sheet. The first and second sheet with the decorative image layer there-between are heated and pressed at a maximum temperature between 193 and 249° C. and a maximum pressure between 138 and 2069 kPa. The time at maximum temperature and pressure is between 0.1 and 20 minutes.

In another aspect, the invention provides a decorative laminate structure including a first sheet comprising polycarbonate, the first sheet having a thickness between 0.13 and 12.7 mm, a second sheet comprising polycarbonate, the second sheet having a thickness between 0.13 and 12.7 mm, and at least one a decorative image layer between the first and second sheet.

In yet another aspect, the invention provides a decorative laminate structure including a first sheet comprising polycarbonate, the first sheet having a thickness between 0.13 and 12.7 mm; a second sheet comprising polycarbonate, the second sheet having a thickness between 0.13 and 12.7 mm; a third sheet of polycarbonate, the third sheet having a thickness between 0.13 and 12.7 mm; at least one first decorative image layer between the first and second sheet; and at least one second decorative image layer between the second and third sheet.

These and other aspects are discussed in detail below.

BRIEF DESCRIPTION OF THE DRAWINGS

The present invention is better understood with reference to the accompanying drawings and detailed description wherein.

DETAILED DESCRIPTION OF THE INVENTION

The following detailed description is provided as an aid to those desiring to practice the present invention. The following description is not to be construed as limiting the instant invention, since those of ordinary skill in the art will realize that various modifications, changes and substitutions made can be made in various materials and methods disclosed herein, without departing from the spirit or the scope of the present inventive discovery. Instead, the present invention is defined by the claims appended hereto and the equivalents encompassed thereby.

The invention relates to a decorative laminate structure and a method of making the decorative laminate structure. The laminate structure has aesthetically desirable surface appearance, for example that of wood, stone, kiln cast glass, and solid surface saturated colored products.

The decorative laminate structures include:
(1) a first sheet comprising polycarbonate, the first sheet having a thickness between 0.13 and 12.7 mm;
(2) a second sheet comprising polycarbonate, the second sheet having a thickness between 0.13 and 12.7 mm; and
(3) at least one a decorative image layer between the first and second sheet.

The decorative laminate structures also include:
(1) a first sheet comprising polycarbonate, the first sheet having a thickness between 0.13 and 12.7 mm;
(2) a second sheet comprising polycarbonate, the second sheet having a thickness between 0.13 and 12.7 mm;
(3) a third sheet of polycarbonate, the third sheet having a thickness between 0.13 and 12.7 mm;
(4) at least one first decorative image layer between the first and second sheet; and (5) at least one second decorative image layer between the second and third sheet.

The methods of making a decorative laminate structure include:
(1) providing a first sheet comprising polycarbonate, the first sheet having a thickness between 0.13 and 12.7 mm;
(2) providing a second sheet comprising polycarbonate, the second sheet having a thickness between 0.13 and 12.7 mm;
(3) providing at least one a decorative image layer between the first and second sheet; and
(4) heating and pressing the first and second sheet with the decorative image layer there-between at a maximum temperature between 193 and 249° C. and a maximum pressure between 138 and 2069 kPa, wherein the time at maximum temperature and pressure is between 0.1 and 20 minutes.

The method may further comprise a step in which the first and second sheet with the decorative image layer there-between are cooled at pressure between about 7 and 2065 kPa.

Figure 1:
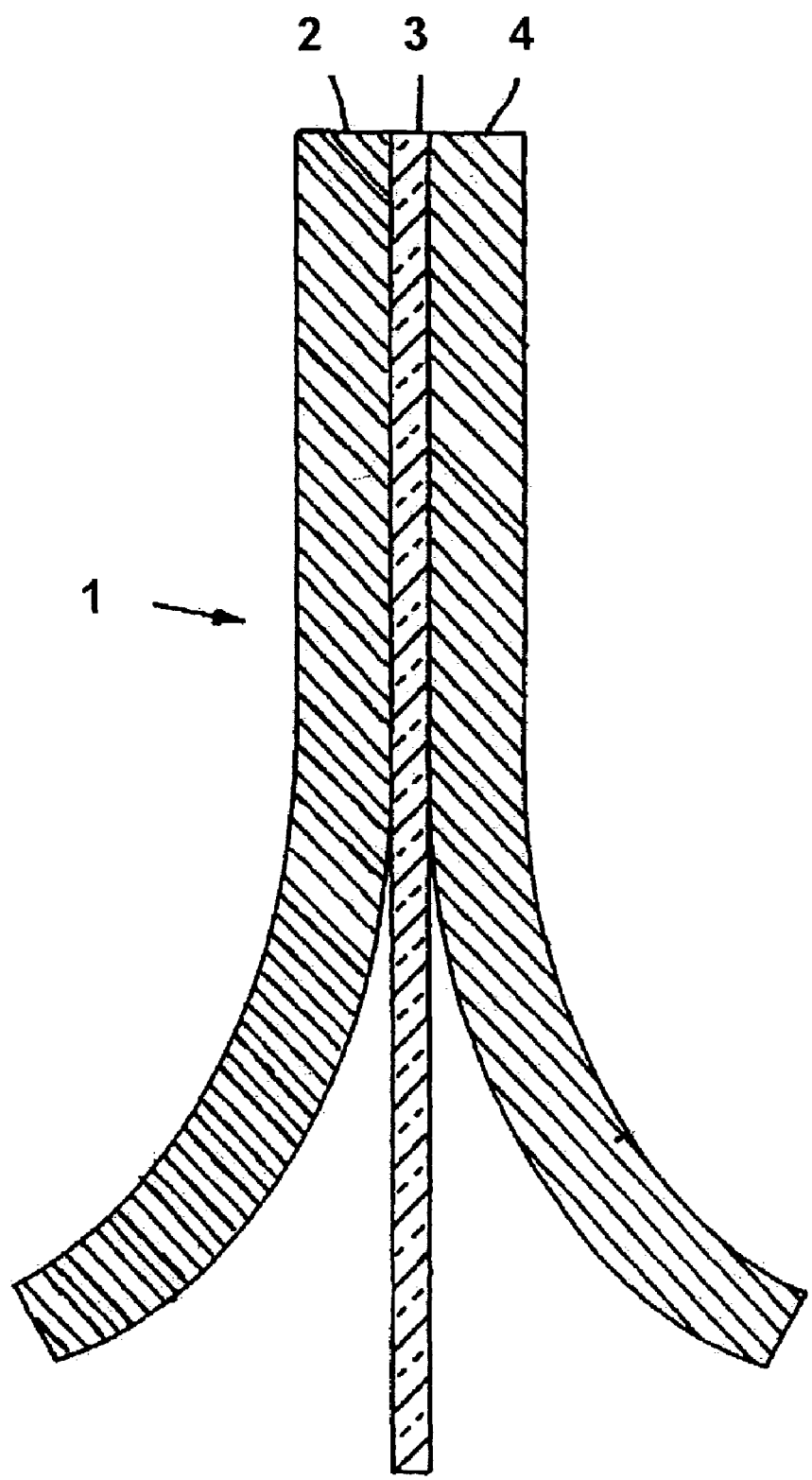
FIG. 1 is a partially separated, cross-section of substantially planar decorative laminate structure according to the present invention.

According to FIG. 1, the decorative laminate structure 1 comprises a first polycarbonate sheet 2, a decorative image layer 3, and a second polycarbonate sheet 4.

Figure 2:
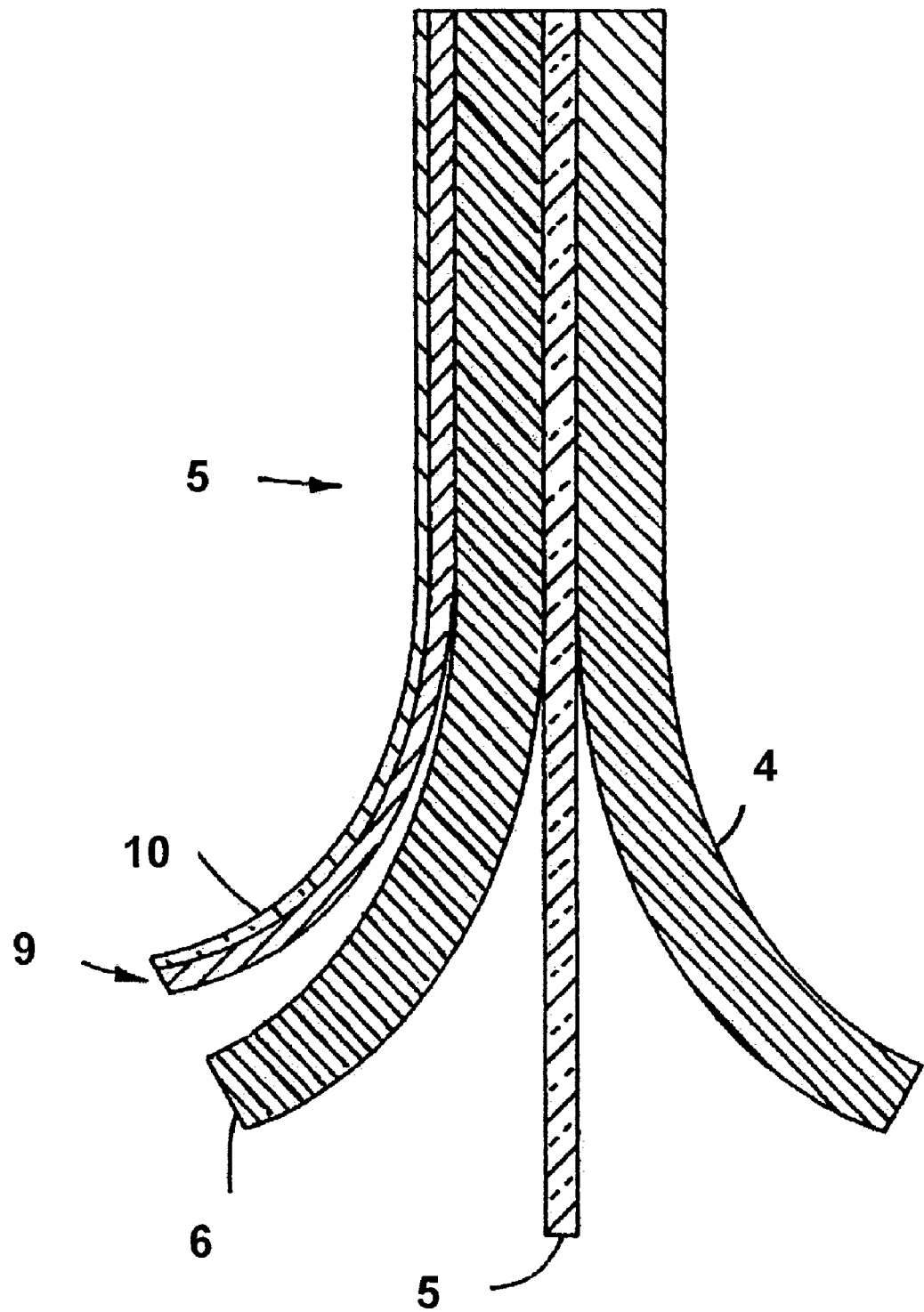
FIG. 2 is a partially separated, cross-section of a substantially planar decorative laminate structure according to the present invention.

According to FIG. 2 the decorative laminate structure 5 according to the present invention comprises a first polycarbonate sheet 6, a decorative image layer 7, and a second polycarbonate sheet 8. The decorative laminate structure further includes a protective layer 9 including a hard coat 10.

The traditional laminate structures and method of making the laminate structures often require laminating enhancers such as adhesives or coupling agents. A great advantage of this invention is that the method of making the decorative laminate structure as described herein does not require use of the laminating enhancers. Preferably, heat and pressure applied to the laminated structure are sufficient to bond the first sheet, the second sheet and the decorative image layer.

Furthermore, one possible explanation for the success of the decorative laminate structure of this invention is based on the polycarbonate properties. For example, properties such as high-melting temperature, increased rigidity, strength, and high impact resistance of the polycarbonate allow the decorative laminate structure of this invention to be used in high-heat and performance driven applications such as automotive, marine, lighting, flooring, commercial construction, signage, exterior use and aerospace.

As used herein, "first," "second," and "third" in connection with the polycarbonate sheets are arbitrary and do not refer to positions and order of the sheet layers relative to each other and the decorative image layer. Furthermore, the first and second sheets are not necessarily the outermost sheets of the decorative laminate structure according to the invention. Therefore, the decorative laminate structure may contain multiple sheets layers on each side of the decorative image layer as well as multiple decorative image layers.

The sheet material used in the preparation of the decorative laminate structures of our invention may be transparent, translucent, or one sheet may be opaque, depending on the particular aesthetic effect desired. The first and second sheets may differ in degree of transparency or translucency and also in color.

The thickness of the sheet layers used in the preparation of the decorative laminate structure depends upon a number of factors such as functionality, weight, cost, etc. The first sheet has a thickness in the range of about 0.13 to 12.7 mm (0.005-0.5 inch), preferably about 0.74 to 10 mm (0.03-0.4 inch), more preferably in the range of about 1.48 to 6.35 mm (0.063-0.126 inch), and most preferably in the range of 2.22 to 6.35 mm. The second sheet typically has a thickness in the range of about 0.13 to 12.7 mm (0.005-0.5 inch), preferably about 0.74 to 10 mm (0.03-0.5 inch), more preferably in the range of about 1.48 to 6.35 mm (0.063-0.126 inch), and most preferably in the range of 2.22 to 6.35 mm. The thickness of the sheets is limited only by functionality. For example, the thickness of the sheet layers is greater in decorative laminates structures used in horizontal applications, such as work surfaces, flooring, and ceilings.

The first and the second sheets of the decorative laminated structure according to the present invention comprise polycarbonate. The term "polycarbonate" refers to polycarbonates for use in the production of the decorative laminated structures of the invention. Polycarbonates are thermoplastic, aromatic polymers and include homopolycarbonates, copolycarbonates and copolyestercarbonates and mixtures thereof which have average molecular weights of about 8,000 to more than 200,000, preferably of about 20,000 to 80,000 and an intrinsic viscosity (I.V.) of 0.40 to 1.5 dl/g as measured in methylene chloride at 25° C. Preferably, the glass transition temperature of polycarbonates ranges from 145 to 148° C. The material's "glass transition temperature (Tg)" is defined as the temperature below which molecules have very little mobility. On a larger scale, polymers are rigid and brittle below their glass transition temperature and elastic above it. Tg is usually applicable to amorphous phases and is commonly applicable to glasses and plastics.

Polycarbonates are a well known class of high impact resistant thermoplastic resins characterized by optical clarity and high ductility. Polycarbonates can be defined as polymers containing recurring carbonate groups (—O—CO—O—) in the main chain. Aromatic polycarbonates are of particular interest in the practice of this invention. These polymers are known per se and are generally prepared by reacting a dihydric phenol, or bisphenol, with a carbonate precursor, e.g., phosgene, a halogen formate, or a carbonate ester (see German Offenlegungsschriften 2,063,050; 1,561,518; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all of which are incorporated herein by reference).

For the polycarbonate, commercially available products may be used and, among them, polycarbonates obtained by the use of the bisphenol A are preferred for their good mechanical properties and also excellent transparency. For example, polycarbonate MAKROLON®3105 from Bayer Plastics is a preferred polycarbonate to use in this invention. Other transparent polycarbonate materials include, for example LEXAN® polycarbonate which can be purchased from General Electric. Also, copolymers of polycarbonates with polyesters may be used.

Figure 3:
FIG. 3 is an illustration of decorative laminate structures.
Figure 3:
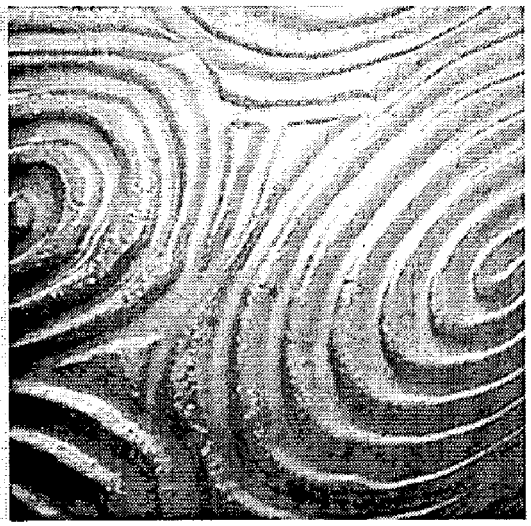
Figure 3:
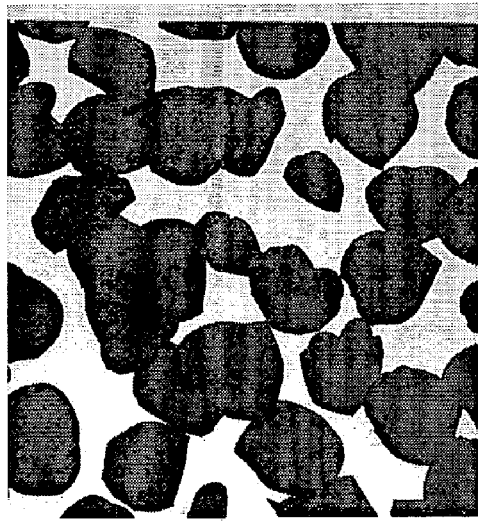
Figure 3:
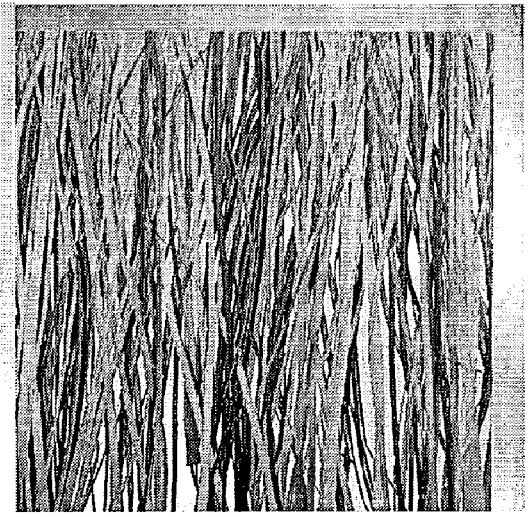

The decorative image layer preferably includes fabric, metallic wire, rod and/or bar, papers or photographic images, crushed glass, and vegetation, such as wood chips, grasses, flowers, wheat, and thatch. The decorative image layer may display images or decorative designs or may be of a solid color. The melting point of the decorative image layer should be sufficiently high to avoid any degradation or distortion of the decorative image layer during the manufacture or processing of the decorative laminate structure of this invention. Preferably, the decorative image layers embedded within the decorative laminate structure of the present invention are substantially continuous and constitute a distinct image layer or laminate, as in FIG. 3B. Alternatively, the decorative image layers embedded within the decorative laminate structure can be made of discontinuous segments, for example as illustrated in FIGS. 3A, C and D.

The decorative image layer preferably ranges from about 0.0254 mm (0.001 inch) to about 1.524 mm (0.06 inch) in thickness, and more preferably 0.0254 mm (0.001 inch) to 0.05 mm (0.002 inch), and most preferably about 0.04 mm (0.0015 inch) in thickness. However, polymeric films thinner or thicker may be used in the decorative image layer depending on the equipment available, and under such conditions the thickness is limited only by functionality.

In a preferred embodiment of the present invention, the decorative laminate structure includes at least one first decorative image layer embedded between the first and the second polycarbonate sheet and at least one second decorative image layer embedded between the second and the third polycarbonate sheet. Furthermore, the first and third sheets are not necessarily the outermost sheets of the decorative laminate structure according to the invention. Therefore, the decorative laminate structure may contain multiple sheet layers on each side of the decorative image layer as well as multiple decorative image layers.

In one embodiment of the present invention, the decorative image layer comprises a fabric comprised of textile fibers. The fabric may display images or decorative designs which have been produced, e.g., by weaving or knitting techniques, in the fabric. The fabrics, which may be used in producing the decorative laminate structures of the present invention, comprise textile fibers, i.e., fibers of natural-occurring, semi-synthetic or synthetic polymeric materials. For example, the fabrics may be prepared from cotton, wool, silk, rayon (regenerated cellulose), polyester such as polyethylene terephthalate, synthetic polyamides such as nylon 66 and nylon 6, acrylic, modacrylic, and cellulose acetate fibers. The melting point of the textile fibers should be sufficiently high to avoid any degradation or distortion of the fabric during the manufacture or processing of the decorative laminate structures of this invention.

The fabric may be woven, spun-bonded, knitted, or prepared by other processes well known in the textile trade and may be uncolored, e.g., white, or colored by conventional dyeing and printing techniques. Alternatively, the fabrics may be produced from dyed yarn or from filaments and yarn derived from mass colored polymers. Preferably, the fabrics present within the decorative laminate structure are substantially continuous and constitute a distinct image layer or laminate.

In one embodiment of this invention, the decorative laminate structure comprising a decorative image layer comprising a fabric can be used in the manufacture of decorative walls, partitions, and glazing applications.

In another embodiment, the decorative image layer comprises metallic wire, rod, or bar. The metal wire may be formed by a variety of techniques to produce metal mesh fabric, screens, or open mesh having high transparency. The metal wire, rod or bar may be woven, welded, knitted, or fabricated by means of other processes well known in the metal wire fabrication trade. The metallic wire, rod and bar may be of various colors such as black, gray, green, blue, etc. The metallic element of the decorative image layer can be composed of different metallic materials such copper, aluminum, stainless steel, steel, galvanized steel, titanium, etc. or combinations thereof. The metallic component of the decorative image layer may be prepared from wire filaments, rods and bars having various cross-sectional areas and geometries, e.g., generally circular, oval or relatively flat. The thickness or diameter of the wire, rod and bar may range from about 0.001 to 19 mm (0.00004 to 0.75 inch) depending upon the desired use of the thermoplastic structure. Preferably, the thickness or diameter of the wire, rod, or bar will be in the range of about 0.0254 to 5.08 mm (0.001 to 0.20 inch).

In one embodiment of this invention, the decorative laminate structure comprising a decorative image layer including wire, rod, or bar can be used in the manufacture of decorative walls, partitions, and security glazing applications.

In further embodiment, the decorative image layer comprises a printed or colored image. Preferably, the printed or colored decorative image layer has opposed surfaces wherein an image is printed on one of the surfaces and/or the decorative image layer contains coloration. More than one printed or colored decorative image layer may be used in the decorative laminate structure of the present invention. The use of multiple decorative image layers can provide a 3-dimensional or "floating" appearance to the decorative images or lettering in the printed or colored decorative image layers. Each of the printed or colored decorative image layers is joined to a first sheet on one of its surfaces such that the image or coloration can be seen through the first sheet without significant distortion. The printed or colored decorative image layer may comprise any suitable polymeric material which is compatible with the materials used for the first sheet and the second sheet, inks, and other materials used in fabricating the decorative laminate structure. Preferably, the decorative image layer comprises a polyvinyl chloride (PVC) or copolyester.

In another embodiment, the image or coloration is printed on the bottom side of the decorative image layer in which case the polymer used to prepare the decorative image layer should be transparent. Any image may be used provided it has an aesthetically desirable surface appearance such as an image of a natural building material. As used herein the term "building material" means a material of suitable strength, durability, impact resistance, and rigidity such that it can be used in construction of articles that could also be constructed of natural building materials such as, but not limited to, wood or stone.

The image to be printed on the decorative image layer can be prepared according to conventional photographic printing processes or with a digitized database generated from a photographic image. Digitizing and storing the image may be accomplished through any of a number of processes well known in the computer art such as scanning.

Printing a selected image on the decorative image layer may be accomplished by engraving one or more cylinders, and using such cylinders to print the selected engraved image on the decorative image layer with appropriate ink, according to processes well known in the printing art. The resolution of the printing method should be in the range of about 30-59 dots per linear cm (75-150 dots per linear inch), i.e. about 872 $cm^2$-3,488 $cm^2$ (5,625-22,500 dots per square inch). An illustrative example of how this printing process can be used for bottom printing a wood grain image on the bottom surface of the decorative image layer comprises using a first cylinder for first printing a pattern of black or other dark colored ink corresponding to the most prominent and most widely spaced grain lines, i.e. coarse grain. A second cylinder may then be used for printing smaller, more closely spaced grain lines, i.e. fine grain, using black or other dark colored ink.

A third cylinder may be used for printing colored bands on the decorative image layer. For example, bands about 3.8 cm (1.5 inch) wide and spaced apart by about 3.8 cm (1.5 inch) are printed in a selected brown color. These bands give the effect of color variations within the wood, and the widths, spacing, and color of such bands are all selectable. A fourth cylinder may be used for printing a relatively solid background color of a selected shade of brown or other color corresponding to the color of the type of wood being simulated. Also, additional cylinders may be used to provide even more image effects in the printed or colored decorative image layer. It is considered that a person of ordinary skill in the art could select more or fewer cylinders and printing steps to prepare a selected image.

These steps would be reversed for top printing an image on the top surface of the printed or colored decorative image layer, i.e. the solid color would be printed first followed in succession by printing of the bands, fine grain, and coarse grain. Typically, there is some stretching of the decorative image layer during printing. Therefore, the second cylinder should be slightly larger than the first cylinder, the third slightly larger than the second, and the fourth slightly larger than the third, so that the image printed with each cylinder is in proper register.

The ink used in the printing is preferably a solvent-based ink with no wax which is critical to producing a durable decorative laminate structure that is resistant to delamination. During bonding together of the sheets and decorative image layers of the decorative laminate structure, the layers of ink should bond with any adjacent decorative image layers as well as to the polymer used to prepare the printed or colored decorative image layer and second sheet (for bottom printing) or first sheet (for top printing). A particularly preferred solvent-based ink comprises about 20-70% of a solvent, about 5-50% of a pigment, a vinyl acetate polymer and formulation aids, and is available from American Mirrex.

The decorative image layer may also be colored throughout its thickness by inclusion of pigments or colorants therein during its manufacture and this colored image may be used as is without printing thereon, or the colored image may be used as background for further printing of images thereon which may be seen through the first sheet of the structure.

In yet another embodiment, the decorative image layer comprises vegetation, such as wood chips, grasses, thatch, flowers, for example rose petals, wheat, grains, natural papers and others, such that the natural color of vegetation is preserved. More than one decorative image layer comprising vegetation may be used in the decorative laminate structure of the present invention. The use of multiple decorative image layers can provide a 3-dimensional or "floating" appearance to the decorative vegetation in the decorative image layers. Each of the decorative image layers is joined to a first sheet on one of its surfaces such that the vegetation can be seen through the first sheet without significant distortion.

In further embodiment, the decorative image layer comprises crushed glass, which may be of various colors, such as black, gray, green, blue, orange, etc. More than one decorative image layer comprising crushed glass may be used in the decorative laminate structure of the present invention. The use of multiple decorative image layers can provide a 3-dimensional or "floating" appearance to the decorative crushed glass in the decorative image layers.

The second sheet comprising polycarbonate may be either transparent or opaque. Hence, the second sheet may be comprised of a high percentage of recycled resin material, which do not necessarily retain transparency or even contain materials that further enhance or modify the properties of the finished decorative laminate structure. However, the first sheet and the second sheet are preferably thermally compatible. As used herein, "thermal compatible" means that when sheet layers of the decorative laminate structure are bonded together under conditions of elevated temperature and pressure, the sheets undergo approximately equal thermal expansion or contraction such that the surface of the decorative laminate structure is substantially planar and interfacial stresses are minimized when the product is thermoformed.

The second sheet should exhibit good impact resistance, strength, and compatibility with the decorative image layer. The thickness of the second sheet is between 0.13 and 12.7 mm (0.005-0.5 inch), preferably between 0.74 and 10 mm (0.03-0.5 inch), more preferably in the range between 1.48 and 6.35 mm (0.063-0.126 inch), and most preferably in the range between 2.22 to 6.35 mm. The thickness is limited only by functionality.

The decorative laminate structure preferably further comprises a protective layer, which is a transparent, hard, scratch-resistant or abrasion resistant coating or layer laminated to the top surface of the first sheet. These coatings or layers also increase the chemical resistance of the decorative laminate structure and provide an anti-graffiti surface. For example, polycarbonate is not as hard or scratch resistant as may be desirable for certain applications. Thus, for an application where the exterior surface might be subjected to being scratched, it may be advantageous to provide a protective layer over the exterior surface. The protective layer may be a bilayer film comprising a protective layer on top of a sheet layer. The protective layer is preferably selected from the UV-cured or electron-beam-cured crosslinked acrylic, vacuum-cured or UV-cured urethane, UV-cured or electron-beam-cured silicon with acrylic or heat cured urethane or plastisol. A layer of polyurethane may be applied over the exterior surface to provide abrasion resistance. Alternatively, a biaxially oriented polyethylene terephthalate, such as MYLAR®, or teflon, such as TEDLAR®, both available from DuPont Chemical Company, may be laminated to the top surface of the first sheet as a protective layer. More preferably, the protective layer comprises a UV-cured or electron-beam-cured silicon to achieve glass appearance.

In one embodiment, a method of making a decorative laminate structure preferably includes providing a first sheet and a second sheet, both comprising polycarbonate, providing at least one a decorative image layer between the first and second sheet, and heating and pressing the first and second sheet with the decorative image layer there-between for a time, temperature and pressure sufficient to cause the sheet layers of the decorative laminate structure to become tacky and bond to each other. However, temperatures which cause decomposition, distortion, or other undesirable effects in the finished decorative laminate structure or sheet material should be avoided. Preferably, pressing of the first and second sheet with the decorative image layer there-between occurs before the application of heat.

In the laminating method according to this invention, a plywood laminating press, such as one from Onsrud Berthelsen, which has been modified to increase efficiency of platens heat transfer and to maximize the number of channels, is preferably used. The increased number of channels allows to evenly distribute the temperature over the entire decorative laminate structure. Also, the laminating press used in the process of making the decorative laminate structure of the present invention has electronic controls and feedback mechanisms to allow for a precise control of the temperature and pressure of the press.

Furthermore, in the laminating press, a metal plate which is preferably a steel or aluminum plate having a thickness of 2 mm, a pressure pad to help equalize pressure which is preferably a compressible fabric pad, and a further flexible metal plate which is preferably a flexible aluminum plate of 1.5-4 mm, are respectively aligned in parallel pressing relation, upon the exterior surface of the first sheet, or protective layer if present. The fabric pad is preferably prepared from copper, silicone, NOMEX®, which is an aramid fiber or fabric available from DuPont de Nemours, E. I. & Company, or a combination of copper and/or silicone and/or NOMEX®.

More preferably, cast paper or embossing paper is disposed between the metal plate and exterior surface of the first sheet or protective layer to provide a texture to the laminate structure and/or to prevent the first polycarbonate sheet or protective layer from sticking to the metal plate. Examples of cast paper or embossing paper include patent paper (which provides high gloss), patina (which provides a satin finish), matte, stucco, ostrich, reptilian, glitter, topaz, grid, and allegro (which provides a leather appearance). A particularly preferred cast paper is available as ULTRACAST® from Sappi. In some instances, a protective coat is not necessary because a heavily textured surface may not display scratch marks.

In one embodiment, sufficient heat and pressure may be provided to effect a bond between the sheet layers of the laminate structure in the absence of a press, employing instead the weight of the superposed sheet layers in conjunction with application of heat. To augment the reduction in pressure, a vacuum may be applied in order to remove trapped air between the adjacent sheet layers and the decorative image layers of the decorative laminate structure. During the bonding process, if necessary, the polycarbonate materials may be bonded or fused together without the use of adhesive.

Preferably, the laminating method comprises hot press bonding and cold press bonding. Hot press bonding methods include, but are not limited to, hot steam, electric heat, hot oil heated and other methods know in the art. Cold press bonding methods include, but are not limited to, cold water, glycol cooled method, and other cooling methods well known in the art. Hot press bonding is conducted at a temperature of about 193° C. to about 249° C. (about 380° F. to about 480° F.), preferably in the range of about 210° C. to about 227° C. (about 410° F. to about 440° F.). The pressures utilized in the bonding or laminating method are about 138 to 2069 kPa (about 20 to about 300 pounds per square inch, psi), and preferably are in the range of about 448 and 662 kPa (65 to about 96 psi). The decorative laminate is held at the appropriate maximum temperature and pressure for a period of time of about 0.1 to about 20 minutes, preferably a period of time of about 0.1 to 5 minutes, most preferably for a period of time of about 0.17 minute (about 10 seconds). The optimal temperature for bonding may vary depending on the thickness of the sheet materials used, and may be determined by those of ordinary skill in the art. A temperature exceeding 249° C. (480° F.) and a pressure exceeding 2070 kPa (300 psi) is undesirable in hot press bonding since the sheet layers may squeeze out of the aligned decorative laminate structure.

This operation can be performed either with or without a vacuum press. Generally, the occurrence of bubbles in the final thermoplastic article produced is less likely to occur if the air is evacuated prior to applying heat and pressure. The pressure on the decorative laminate structure is increased to between 138 to 2069 kPa (about 20 to about 300 psi), preferably to between 448 to 662 kPa (65 to 96 psi), with a pressure of 634 kPa (92 psi) being most preferred. As a result of pressure and heat, the sheets of polycarbonate are fused together and the decorative image layer is embedded or encapsulated within the polycarbonate sheets.

Following the hot press bonding, the bonded structure is allowed to cool by being held rigid at a temperature of about 10 to about 149° C. (50° F. to about 300° F.), preferably 21.1 to 32.2° C. (70° F. to 90° F.) and a pressure of about 7 to 2069 kPa (about 1 to about 300 psi), preferably pressures of about 448 to 662 kPa (65 to about 96 psi), more preferably pressures of about 552 to 662 kPa (80 to 96 psi), most preferably about 634 kPa (92 psi) until it cools below the glass transition temperature of the sheet material.

Lamination may be conducted using individual relatively short sheets of overlaid material or using elongated sheets for later width wise separation. The material is preferably laminated in a stationary press, however, the material may be laminated using continuous casting equipment of the type used in the plastics industry for producing laminate web material such as a machine employing upper and lower continuous belts. At least one of the belts is generally heated and the decorative laminate structure is fed into the space between the belts for movement with the belts while being heated and pressed.

Once the decorative laminate structure is cooled below the glass transition temperature of the polycarbonate, it may be shaped and formed into a variety of useful articles by thermoforming or other known methods such as extrusion or injection molding. For example, the thermoplastic article can be thermoformed or otherwise shaped into privacy partitions, shower surrounds, table tops, or other uses. The thermoplastic articles of this invention can be formed and molded without substantially distorting the decorative image layer contained therein.

In addition to illustrative articles which include counter tops, table tops, cabinet doors, game boards, juvenile products, toys, panels for shower stalls, hot tubs, markerboards, indoor and outdoor signs, seamless vanity tops including sink, soap dish, and back splash, the decorative laminate structure can be used in automotive, for example as a dashboard, marine, lighting, and aerospace products. For further example, parts of a commercial aircraft interior can be readily formed from the decorative laminate sheets and include door linings and window bezels, door handle escutcheons, emergency route indicator strips, instrument panels, etc.

While the invention has been described with particular reference to certain embodiments thereof, it will be understood that changes and modifications may be made which are within the skill of the art. The present invention is limited only by the claims that follow.

EXAMPLES

The following examples are presented to illustrate the invention and should not be construed to limit the scope of the invention.

Example 1

Production of ⅛" Normally Thick Product Encapsulating a Textile

To obtain the desired laminate including uniform aqua colored textile with patina finish on both sides and flat texture, the laminating process was performed as follows. First the hot press platen was preheated to a temperature of 475° F. The cold press platen temperature was set at 65° F.

Next the materials were assembled from top to bottom as follows: steel press plate, Nomex pad (Nomex pressure distribution pads), aluminum separation plate, release paper (patina finish Ultra-cast release paper), 0.060" polycarbonate sheet (qty=2), textile (sheer nylon textile), 0.060" polycarbonate sheet, release paper, aluminum separation plate, Nomex pad, and steel press plate.

After the assembly was completed, a thermocouple was inserted in-between the first sheet of polycarbonate and the textile. Next, the assembly was inserted in the hot press, the press was closed and the pressure was increased to 94 psi. The temperature was closely monitored until the thermocouple read 420° F. Once the temperature reached the desired 420° F., the pressure was released and the press opened. Following hot pressing, the assembly was transferred to the cold press set to cold press platen temperature of 65° F. Next, the pressure in the cold press was increased to 94 psi. This transfer and re-pressurizing was completed in less than 3 minutes. The temperature was closely monitored until the thermocouple read 90° F. Once the desired temperature was reached, the decorative laminate structure was removed from the press.

As a result, the finished product was thermally fused through the fabric layer, resulting in a monolithic structure. Surface finishes on the top and bottom of the product were uniform and even and the color of the fabric was uniform and even due to full saturation by the polycarbonate resin.

Example 2

Production of ¼" Nominally Thick Product that is Heavily Textured

To obtain the desired laminate including slightly foggy image layer with patina finish on the back and heavy texture (Quo Mezzo, 3/16" deep, v-shaped profile, sinusoidal pattern) on the front, the laminating process was performed as follows. First the hot press platen was preheated to a temperature of 475° F. The cold press platen temperature was set at 65° F.

Next the materials were assembled from top to bottom as follows: steel press plate, Nomex pad (Nomex pressure distribution pads), aluminum separation plate, release paper (patina finish Ultra-cast release paper), hard coated polycarbonate film (0.005" thick film), oriented with hard-coat against layer, 0.118" polycarbonate sheet (qty=2), textile (clear Glassheen textile), 0.118" polycarbonate sheet, release paper, aluminum separation plate, Nomex pad, and steel press plate.

After the assembly was completed, a thermocouple was inserted in-between the first sheet of polycarbonate and the textile. Next, the assembly was inserted in the hot press, the press was closed and the pressure was increased to 94 psi. The temperature was closely monitored until the thermocouple read 440° F. Once the temperature reached 440° F., the pressure was released and the press opened. Next, the assembly was removed and split between the first release paper and hard-coated polycarbonate film. The Quo Quo Mezzo mold was placed face down against hard-coated polycarbonate sheet. Next, the assembly was transferred to the cold press set to cold press platen temperature of 65° F. and the pressure in the cold press was increased to 94 psi. This transfer and re-pressurizing was completed in less than 3 minutes. The temperature was closely monitored until the thermocouple read 90° F. Once the desired temperature was reached, the decorative laminate structure was removed from the press.

As a result, the finished product was thermally fused through the fabric layer, resulting in a monolithic structure. Surface finishes on the bottom of the product were uniform and even. The color of the fabric was uniform and even due to full saturation by the polycarbonate resin and the Quo Mezzo texture has been embossed in the polycarbonate structure uniformly.

Example 3

Production of ⅜" Nominally Thick Product Encapsulating Botanical Matter

To obtain the desired laminate structure, including botanical matter with clear resin, flat texture, thatch reeds embedded on multiple layers, and patina finish on both sides, the laminating process was performed as follows.

First the hot press platen was preheated to a temperature of 475° F. The cold press platen temperature was set at 65° F.

Next the materials were assembled from top to bottom as follows: steel press plate, Nomex pad (Nomex pressure distribution pads), aluminum separation plate, release paper (patina finish Ultra-cast release paper), 0.118" polycarbonate sheet (qty=2), thatch (thatch reeds), 0.236" polycarbonate sheet, thatch, 0.118" polycarbonate sheet, release paper, aluminum separation plate, Nomex pad, and steel press plate.

After the assembly was completed, a thermocouple was inserted in-between the first thatch and 0.236" polycarbonate sheet. Next, the assembly was inserted in the hot press, the press was closed and the pressure was increased to 10 psi. The temperature was closely monitored until the thermocouple read 410° F. Once the temperature reached 440° F., the pressure was increased to 30 psi. The temperature was closely monitored until the thermocouple read 420° F. and once it reached the desired temperature the pressure was again increased to 94 psi. The temperature was closely monitored until the thermocouple read 435° F. Next, the pressure was released and the press opened. The assembly was then transferred to the cold press set to cold press platen temperature of 65° F. and the pressure in the cold press was increased to 94 psi. This transfer and re-pressurizing was completed in less than 3 minutes. The temperature was closely monitored until the thermocouple read 90° F. Once the desired temperature was reached, the decorative laminate structure was removed from the press.

As a result, the finished product was thermally fused around and through the pieces of thatch, resulting in a monolithic structure. The surface finishes on the top and bottom of the product were uniform and even.

What is claimed is:

1. A decorative polycarbonate laminate panel structure having a plurality of layers that are thermoformed into a decorative polycarbonate panel, and that display a decorative image layer, comprising:
    at least a first layer, a second layer, and a third layer thermoformed together as a decorative polycarbonate laminate panel;
    wherein at least one of the first layer, second layer, or third layer includes a polycarbonate sheet, the polycarbonate sheet having a thickness between 0.13 and 12.7 mm, and at least another of the first layer, the second layer or the third layer includes a decorative image layer comprising a fabric embedded in the polycarbonate sheet;
    wherein the decorative image layer has been thermoformed into the polycarbonate sheet, whereby the polycarbonate laminate structure displays the decorative image layer.

2. The decorative laminate structure of claim 1, wherein the polycarbonate sheet is transparent, wherein the decorative image layer can be seen through the polycarbonate sheet.

3. The decorative laminate structure of claim 1, wherein the decorative image layer further comprises one or more metallic wires, metallic rods, or metallic bars.

4. The decorative laminate structure of claim 1, wherein the decorative image layer further comprises vegetation.

5. The decorative laminate structure of claim 4, wherein vegetation is selected from the group consisting of wood chips, grasses, thatch, flowers, flower petals, wheat, grains, and natural papers.

6. The decorative laminate structure of claim 1, wherein the decorative image layer comprises crushed glass.

7. The decorative laminate structure of claim 1, wherein the thickness of the first sheet is between 0.74 and 10 mm thick.

8. The decorative laminate structure of claim 1, wherein the thickness of the first sheet is between 1.48 and 6.35 mm thick.

9. The decorative laminate structure of claim 1, wherein the thickness of the first sheet is between 2.22 and 6.35 mm thick.

10. The decorative laminate structure of claim 1, wherein the thickness of the decorative image layer is between 0.0254 and 1.524 mm thick.

11. The decorative laminate structure of claim 1, wherein the thickness of the decorative image layer is between 0.0254 and 0.05 mm thick.

12. The decorative laminate structure of claim 1, wherein the thickness of the decorative image layer is about 0.04 mm.

13. The decorative laminate structure of claim 1, wherein the thickness of the second layer is between 0.74 and 10 mm thick.

14. The decorative laminate structure of claim 1, wherein the thickness of the second layer is between 1.48 and 6.35 mm thick.

15. The decorative laminate structure of claim 1, wherein the thickness of the second layer is between 2.22 and 6.35 mm thick.

16. The decorative laminate structure of claim 1, further comprising an embossing paper removably bonded to an outer layer of the first or second sheets.

17. The decorative laminate structure of claim 1, wherein the at least one decorative image layer further comprises a printed or colored image layer having opposed first and second surfaces.

18. The decorative laminate structure of claim 17, wherein, an image is printed on one of the first and second surfaces, and wherein the decorative image layer further comprises coloration.

19. The decorative laminate structure of claim 18, wherein the decorative image layer comprises a polyvinyl chloride (PVC) or copolyester material.

20. The decorative laminate structure of claim 2, further comprising a protective layer consisting of a bilayer film.

21. The decorative laminate structure of claim 1, further comprising a protective layer, wherein the protective layer is applied on at least one surface of the first sheet, the protective layer being selected from the group consisting of UV-cured or electron-beam-cured crosslinked acrylic, vacuum-cured or UV-cured urethane, UV-cured or electron-beam-cured silicon with acrylic or heat cured urethane or plastisol, and combinations thereof.

22. The decorative laminate structure of claim 1, wherein the fabric of the decorative image layer is woven.

23. The decorative laminate structure of claim 1, wherein at least the polycarbonate sheet is thermally fused through the at least one decorative image layer.

24. The decorative laminate structure of claim 1, wherein the at least one decorative image layers further comprises a photographic image.

25. The decorative laminate structure as recited in claim 23, wherein at least two of the first, second, or third layers comprise a polycarbonate sheet.

26. A rigid, impact resistant, decorative polycarbonate laminate panel structure with a thickness from at least ⅛ inch to about 1 inch, comprising:
   at least a first layer, a second layer, and a third layer thermoformed together in a decorative polycarbonate laminate panel structure;
   wherein:
      at least one of the first layer, second layer, or third layer includes a polycarbonate sheet, the polycarbonate sheet having a thickness between about 1.48 mm and 12.7 mm;
      at least another of the first layer, the second layer or the third layer includes a decorative image layer that is thermoformed adjacent the polycarbonate sheet such that the decorative image layer is embedded in the polycarbonate sheet, wherein the polycarbonate laminate structure displays the decorative image layer; and
      two of the first layer, second layer, and the third layer are thermally compatible.

27. The polycarbonate laminate structure as recited in claim 26, wherein the decorative image layer comprises a woven fabric.

28. The polycarbonate laminate structure as recited in claim 27, wherein the polycarbonate sheet is thermally fused around and through the decorative image layer.

29. The polycarbonate laminate structure as recited in claim 28, wherein the decorative image layer comprises vegetation.

30. A rigid, impact resistant, decorative polycarbonate laminate panel structure with a thickness from at least ⅛ inch to about 1 inch, comprising:
   at least a first layer, a second layer, and a third layer thermoformed together in a decorative polycarbonate laminate panel structure;
   wherein:
      at least one of the first layer, second layer, or third layer includes a polycarbonate sheet, the polycarbonate sheet having a thickness between about 1.48 mm and 12.7 mm;
      at least another of the first layer, the second layer or the third layer includes a decorative image layer that is thermoformed adjacent the polycarbonate sheet such that the decorative image layer is embedded in the polycarbonate sheet, wherein the polycarbonate laminate structure displays the decorative image layer; and
      the decorative image layer is intermittently opaque in the decorative polycarbonate laminate panel structure.

31. A decorative polycarbonate laminate panel structure having a plurality of layers that are thermoformed into a decorative polycarbonate panel that displays a decorative image layer, comprising:
   at least a first layer, a second layer, and a third layer thermoformed together as a decorative polycarbonate laminate panel;
   wherein at least one of the first layer, second layer, or third layer includes a polycarbonate sheet, the polycarbonate sheet having a thickness between 0.13 and 12.7 mm, and at least another of the first layer, the second layer or the third layer includes a decorative image layer embedded in the polycarbonate sheet consisting of a non-synthetic or non-melting material, wherein the non-synthetic or non-melting material is selected from the group consisting of a fabric, metallic wire, rod, bar, papers, photographic images, crushed glass, and vegetation;
   wherein the decorative image layer has been thermoformed into the polycarbonate sheet such that the decorative image layer is embedded therein, whereby the polycarbonate laminate structure displays the decorative image layer.

* * * * *